US007164351B2

(12) United States Patent
Matsumae et al.

(10) Patent No.: US 7,164,351 B2
(45) Date of Patent: Jan. 16, 2007

(54) IMAGE FORMING DEVICE

(75) Inventors: Keisaku Matsumae, Osaka (JP); Yoshiyuki Fujiwara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 183 days.

(21) Appl. No.: 10/904,187

(22) Filed: Oct. 28, 2004

(65) Prior Publication Data

US 2005/0095014 A1 May 5, 2005

(51) Int. Cl.
*B60Q 1/26* (2006.01)

(52) U.S. Cl. .................. 340/468; 340/506; 340/425.4; 340/441; 340/461; 340/815.4; 399/8; 399/9; 399/18

(58) Field of Classification Search ................ 340/468, 340/506, 425.5, 441, 461, 462, 815.4, 815.45; 399/8, 9, 10, 18, 21, 22
See application file for complete search history.

(56) References Cited

U.S. PATENT DOCUMENTS 6,026,252 A * 2/2000 Kawai ......................... 399/10
6,804,473 B1 * 10/2004 Nakamura et al. ............ 399/16

FOREIGN PATENT DOCUMENTS

JP A-H11-119601 4/1999
JP A-H11-119605 4/1999

* cited by examiner

*Primary Examiner*—Hung Nguyen
(74) *Attorney, Agent, or Firm*—Global IP Counselors, LLP

(57) ABSTRACT

An image forming device is disclosed which includes a problem detection unit for detecting problem, and problem alert unit for alerting a user to the detection of a problem. Until an initially detected problem A has been resolved, the problem alert unit will not issue a problem alert based upon a subsequently detected problem B. Consequently, when working to resolve a problem, if a subsequent problem B is detected, the detection of the problem B will be disregarded, and a problem alert will not be issued (by a buzzer or the like), and thus the user can devote themselves to resolving problem A without being disturbed by the buzzer or the like.

6 Claims, 9 Drawing Sheets

| Urgency | Nature of the Problem |
| --- | --- |
| 1 | Document jam or misfeed in document feeder |
| 2 | Paper jam or misfeed in paper tray |
| 3 | Mechanical or system hardware failure |
| 4 | Problems with auxiliary equipment or auxiliary function |
| 5 | Replace consumable |
| 6 | Out of staples |
| 7 | Out of paper |
| 8 | Output tray full |

*Fig. 7*

PRIOR ART

PRIOR ART

IMAGE FORMING DEVICE

BACKGROUND OF THE INVENTION

1. Field of the Invention

The present invention relates to image forming devices of which copiers, scanners, printers, fax machines, multifunction devices and the like are representative, and more particularly to an image forming device whereby, when working to resolve a problem in response to an initially generated problem alert, the work of resolving the problem can be performed without the user being bothered by subsequently generated problem alerts.

2. Background Information

Conventional image forming devices such as photocopiers, fax machines or multifunction devices, which combine these functions, are provided with problem alert means for alerting a user to a problem by way of a sound, a display, a light, or the like.

These problem alert means alert the user to a problem by turning on a light emitting component or generating a sound in the event of problems such as document paper jams or running out of paper. Furthermore, multifunction devices issue similar alerts when a specific job has ended.

Note that the urgency (importance) of the particular problem may, for example, be ranked in the manner shown in FIG. 7.

When the user notices the problem alert and resolves the problem, the problem alert is automatically stopped and the image forming device is able to resume operations.

However, if the problem is not completely resolved, the problem alert does not end, meaning that the flashing light or the sound continues indefinitely, which is aurally or visually annoying for the user who is working to resolve the problem.

Furthermore, multifunction devices are provided with various functions, meaning that problems often occur that are not related to the job in progress. It is extremely annoying if a problem alert is issued for each of these by way of a sound, a flashing light, or the like, making it difficult to operate the multifunction device.

In order to overcome the first of these disadvantages, the following technology has been proposed.

Specifically, in the block diagram shown in FIG. 8, if a problem detecting means 101 detects a functional problem, a problem alert execution means 102 will control a notification device 103 so as to issue a problem alert.

When the problem alert is issued, if a control panel on which a button or the like is provided is operated by the user, or the platen cover is opened or closed, this action will be detected by a user operation detection means 106, and a problem alert stop means 105 will stop the problem alert.

Note that reference numeral 104 indicates a job completion alert execution means, reference numeral 107 indicates alert continuation time storage means, and reference numeral 108 indicates a timer.

Thus, even if the problem is not resolved, the user can intentionally stop the problem alert (for example, see JP-11-119601-A).

Furthermore, the following technology has been proposed for solving the second of these disadvantages. Specifically, with reference to the block diagram shown in FIG. 9, execution state detecting means 111 will detect the execution state of various functions based on signals from various sensors in the image forming device. If an execution state which should be reported is detected, a notification control execution means 112 will control a notification device 103 so as to report the execution state. Methods of notification include turning on a light 103*a* and emitting a sound from a speaker 103*b*, both of which form portions of the notification device 103.

An operation detection means 114 will detect the operation of a control panel 115 by the user. The operation detection means 114 will determine that an operation is ongoing for the time that it takes the timer 108 to count a predetermined amount of time from, for example, the pressing of any button on the control panel 115. If the control panel 115 is further operated while this count is ongoing, the timer 108 resets the count value and recommences the count. A notification stop means 116 wll stop notification by the notification device 103 while a user operation is in progress.

In other words, if the execution state detection means 111 detects a functional execution state that should be reported, the notification control means 112 will report the execution state by way of the notification device 103. However, if an execution state that should be reported, but which is unrelated to the operation currently being performed by the user, is detected by the operation detection means 114, an alert stop means 117 will stop the notification from being issued during the operation.

In this manner, the user is able to perform operations without being bothered by unrelated problem alerts (for example, see JP-11-119605-A).

However, the technology described in JP-11-119601-A is such that, although the user is able to prevent a problem alert (such as a buzzer) for a given problem U, if a new problem V occurs while the user was working to solve this problem, a problem alert (buzzer) is issued for the new problem V, even if problem U had not been resolved (before completion of the problem resolution task). Consequently, one disadvantage is that the annoyance (for example, an annoying sound) is not eliminated.

Furthermore, the technology described in JP-11-119605-A is such that, when using, for example, a function W of a multifunction device (such as a scanner function), problems relating to a function X (such as a facsimile transmission function) are not reported. Consequently, even if a first problem with the function W (such as a first scanner problem) are not yet resolved, if a subsequent problem occurs with the function W (such as a second scanner problem), this subsequent problem alert will be issued (for example, by a buzzer).

In addition, no disclosure is made as to the manner in which problem alerts are controlled for problems that occur when operations are not being performed for the function W. Consequently, one disadvantage is that the user annoyance is not eliminated.

The present invention is directed at solving the problems described above, and an object thereof is to provide an image forming device whereby, while working to resolve a problem in response to an initially generated problem alert, the work of resolving the problem can be performed without the user being bothered by subsequently generated problem alerts.

SUMMARY OF INVENTION

According to a first aspect of the present invention, an image forming device includes a problem detection unit (the first problem detection unit 71 in FIG. 5) which serves to detect problems, and at least one problem alert unit (light 41, speaker 42, buzzer 43, and the like) that serves to alert a user to the detection of a problem. Until an initially detected problem has been resolved, the problem alert unit will not issue a problem alert due to the presence of a subsequently detected problem.

The configuration and operation of the image forming device can be illustrated by FIGS. 1, 5 and 6. As shown in FIG. 1, when an initial problem A occurs ("1"), the problem detection unit (the first problem detection unit 71) will detect the problem A ("2") and a problem alert will be issued ("3") (for example, by a flashing light, a signal tone from a speaker, or a buzzer). If a problem alert stop unit 30A is operated so as to stop the problem alert ("4") (if resolution work is started), problem alerts will be stopped ("5"). Accordingly, users can devote themselves to resolving the problem without the disturbance of a flashing light, a signal tone or a buzzer.

However, if a subsequent problem is detected (a separate problem B detected by the first problem detection unit 71) during work to resolve the initial problem (from "1" to "6"), the problem detection disregard unit 63 will disregard the detection of the problem B so that a problem alert (buzzer or the like) will not be issued, thus allowing users to devote themselves to resolving the problem without the disturbance of a buzzer or the like (for either problem A or problem B).

Next, when problem A and problem B have been resolved ("6"), the image forming device resumes normal operations ("7") so that the user can use the image forming device.

According to another aspect of the present invention, until a problem initially detected by one problem detection unit is resolved (for example, the first problem detection unit 71) from among a plurality of problem detection units (first and second problem detection unit 71 and 72 and first and second job execution detection unit 73 and 74 in FIG. 5), the problem alert unit will not issue a problem alert based upon a problem subsequently detected by another problem detection unit (for example, the second problem detection unit 72).

The configuration and operation thereof can be illustrated by FIGS. 1, 5 and 6. Thus, as shown in FIG. 1, when an initial problem A occurs ("1"), a problem detection unit (first problem detection unit 71) will detect the problem A ("2") and a problem alert will be issued (for example, by a flashing light, a signal tone from a speaker, or a buzzer) ("3"). If a problem alert stop unit 30A is operated ("4") (if resolution work is started), problem alerts will be stopped ("5"). Accordingly, users can devote themselves to resolving the problem without the disturbance of a flashing light, a signal tone or a buzzer.

However, if a subsequent problem is detected (for example, if a separate problem B is detected by the second problem detection unit 72) while working to resolve the initial problem (from "1" to "6"), the problem detection disregard unit 63 will disregard the detection of the problem B so that the problem alert (buzzer or the like) will not issue, and thus allowing users to devote themselves to resolving the problem without the disturbance of a buzzer or the like.

Next, when resolution operations have terminated for problem A and problem B ("6"), the image forming device will resumes normal operations ("7") so that the user can use the image forming device.

Furthermore, according to another aspect of the present invention, if an initially detected problem A is resolved, but a subsequently detected problem B is not resolved, a problem alert will be issued based upon this subsequently detected problem B.

This operation can be illustrated by FIG. 6. Thus, after the user finishes responding to an initial problem A (after resolving the problem) at step S6, if a separate problem (problem B) has occurred (step S7: yes), the routine will return to step S1 and an alert is issued for problem B (buzzer). As a result of this alert for problem B, the users are made aware of the fact that problem B has not been resolved, and turn their attention to resolving problem B.

In another aspect of the present invention, a plurality of types of problems are detected and a priority ranking is determined for each of these problems according to the importance thereof (see FIG. 7). Even if a problem having a higher priority ranking is detected before a problem having a low priority ranking is resolved, the problem alert unit will not issue an alert for the problem having the higher priority ranking until a problem having the low priority ranking is resolved.

The configuration and operation can be illustrated by FIGS. 5 to 7. If, for example, a problem alert was issued in response to a problem having a low priority ranking (rank 7: OUT OF PAPER), even if a problem is detected that has a higher priority ranking (rank 1: DOCUMENT JAM), this problem is disregarded and no problem alert is issued, so that the user can calmly work to resolve the "rank 7: OUT OF PAPER" problem.

According to another aspect of the image forming device, the problem alert unit will issue a problem alert by generating a sound.

The configuration can be illustrated by FIGS. 1 and 5–7. Users find annoying sounds (such as buzzers) particularly distracting when working to resolve a problem. However, according to the present invention, the "sound" is cut off ("4") when operations for resolution of a problem A begin, and even if a subsequent problem B is detected, the "sound" remains cut off until the initial problem A has been resolved, allowing the work of resolving the problem to be performed in a relaxing environment. Likewise, when a problem B is detected, the work of resolving the problem can be performed in an environment in which alerts for problem B are not issued.

According to another aspect of the present invention, the image forming device includes one or more functions selected from a group consisting of a copy function, scanner function, a facsimile function and a printer function.

The configuration can be illustrated by FIGS. 1 and 4–6. Multifunction devices have a plurality of functions, and therefore the number of types of problems detected and the frequency of detection may be high. However, according to the present invention, if work is begun to resolve an initially detected problem A ("4"), a problem alert will not issued for a subsequently detected problem B, allowing work on resolving the problem to be performed calmly. Likewise, when a problem B is detected, work on solving the problem can be performed in an environment in which alerts are not issued for problem B.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 shows an example of a problem urgency ranking employed in a conventional image forming device;

DETAILED DESCRIPTION

Figure 1:
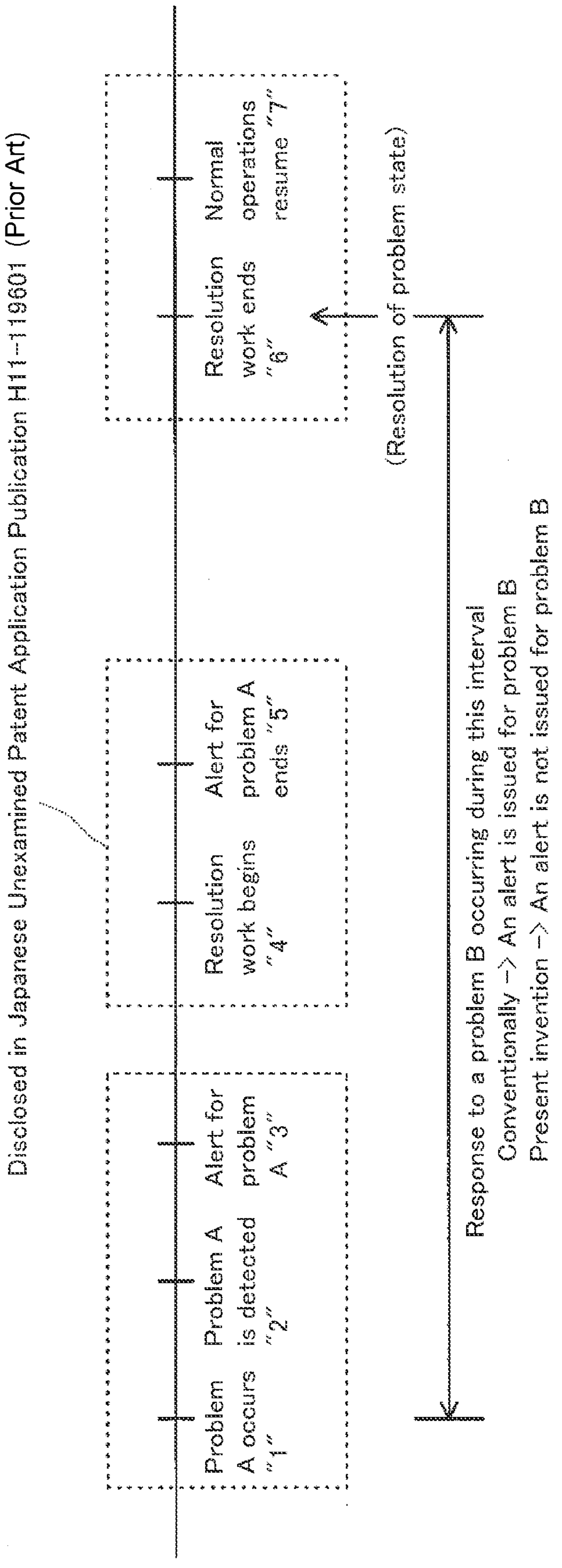
FIG. 1 is a timing chart describing a process flow according to the present invention.

Turning now to FIG. 1, a process flow according to the present invention is described.

If an initial problem A occurs ("1"), the problem A is detected ("2") and an alert is issued for the problem A ("3") (for example, by a buzzer). Having heard the buzzer, the user begins work to resolve the problem A ("4") and the alert for the problem A is terminated (the buzzer is stopped) ("5"). Note that processes "4" and "5" are described in JP-11-119601-A.

Here, let us assume that, after the initial problem A has occurred ("1"), a subsequent problem B occurs. In this case, with conventional technology, an alert would be issued for the problem B (even though the buzzer resulting from the problem A had been stopped, a buzzer would be operated for problem B). Thus, a user having stopped the buzzer for problem A and working to resolve this problem will be disturbed by the alert issued (by the buzzer) for problem B.

Here, with the present invention, in the foregoing scenario, work on resolving the initial problem A is performed without the alert (buzzer) for the subsequent problem B being issued (the buzzer for problem A remains stopped), and when operations to resolve problem A are finished, an alert will be issued for problem B (by the buzzer). When the user begins work to resolve problem B, the alert for problem B is stopped (the buzzer is stopped), and the user can work to resolve the problem without being disturbed by the buzzer.

Next, after the causes of problem A and problem B have been removed ("6"), the image forming device resumes normal operations ("7").

Figure 2:
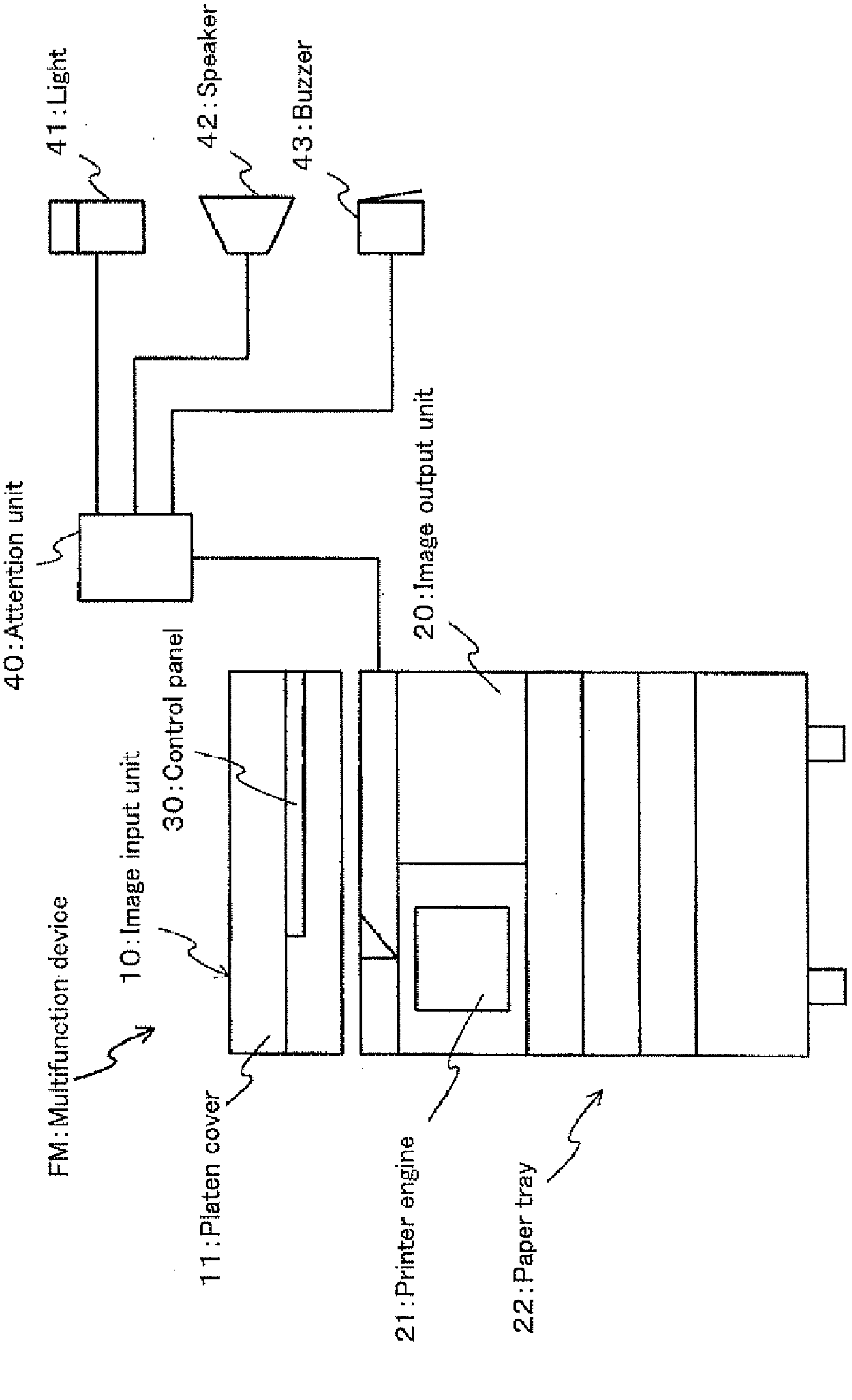
FIG. 2 is a view illustrating the external structure of an image forming device (multifunction device) according to the present invention.

FIG. 2 is a view illustrating the external structure of a multifunction device according to an embodiment of the image forming device.

As shown in the figure, the multifunction device FM combines copying, facsimile, printing and scanning functions and, in order to realize these functions, is provided with an image input unit 10, an image output unit 20, a control panel 30 and an attention unit (problem alert unit) 40.

The image input unit 10 is such that a document is placed on a platen cover 11 and text and graphics on the document can be read as image data by driving a reading device (scanner) (not shown in the figures). The image data that is read is temporarily stored in memory and subsequently converted to a facsimile signal, a print-output image signal, or the like.

At the top of the image output unit 20 is housed a printer engine 21 for printing image data read by the image input unit 10, as well as facsimile data sent from other fax machines and text and image data sent from a user terminal device or the like. At the bottom, paper trays 22 are provided for storing various sizes of paper.

The control panel 30 is unitary with the image input unit 10. As described below, this control panel 30 is provided with a liquid crystal display and various buttons. Functions such as copying, faxing, printing and scanning can be used according to settings on the control panel 30. Furthermore, when a problem alert is issued by the attention unit 40, the problem alert can be stopped by operating the control panel 30.

The attention unit 40, which serves as the problem alert device, includes a light 41, a speaker 42 and a buzzer 43, and alerts the user to problems or to the completion of a job, by way of light and sound. The light 41 can, for example, emit two colors of light, and a flashing display with colors corresponding to the nature of the problem is possible.

Note that the problem alert (for example, the buzzer) often continues for a long period of time (for example, five minutes, or depending on the nature of problem, until such time as the problem has been resolved), but the job completion alert (for example, a signal tone emitted by a speaker) often ends after a short period of time (for example, a few seconds).

Furthermore, if the problem alert and the job completion alert are issued by way of a display or a light, these usually continue until the display or the light is turned off, since these are less disturbing for the user.

As shown in FIG. 7, examples of problem alerts include those for misfeeds or document jams in the document feeder, misfeeds and paper jams in the paper trays, mechanical or system hardware failures, problems with auxiliary equipment or auxiliary functions, replacement of consumables, running out of staples, running out of paper, output tray full, etc. Furthermore, examples of job completion alerts include those for finishing the printing of a received fax, for completion of all automatic reports, etc.

Figure 3:
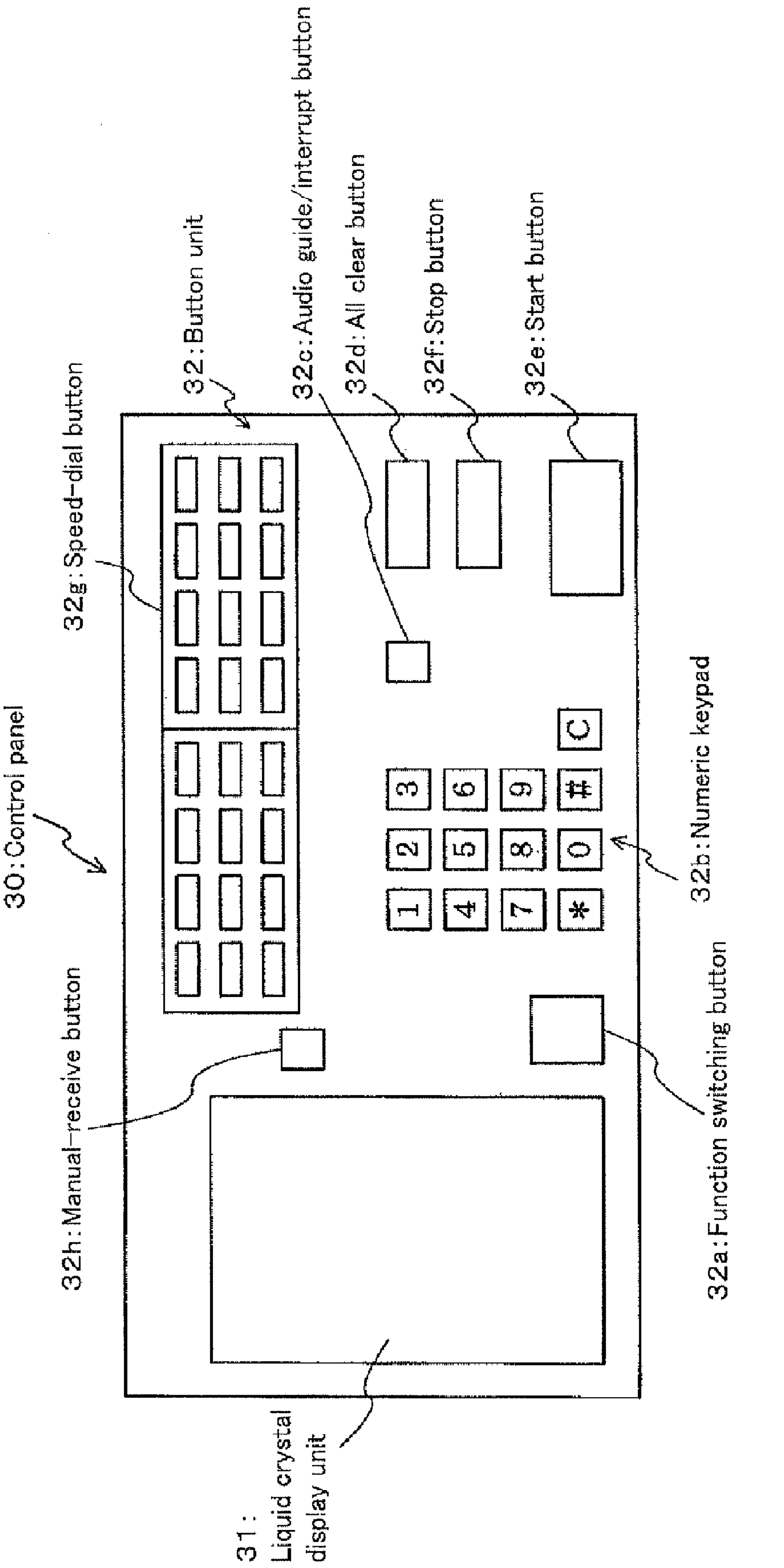
FIG. 3 is a view illustrating one example of a control panel on the image forming device (multifunction device) shown in FIG. 2.

FIG. 3 illustrates one example of the structure of the control panel 30. The control panel 30 is provided with a liquid crystal display unit 31 and a button unit 32. The liquid crystal display unit 31 includes a touch panel having a screen for displaying setting guidance screens for the various settings. Furthermore the liquid crystal display unit 31 is such that, when a problem arises, the nature of the problem can be shown by a graphic display and a text display. Various operations are performed by operating the touch panel in accordance with the indicators on the screen.

The button unit 32 is provided with a function switching button 32*a*, a numeric key-pad 32*b*, an audio guide/interrupt button 32*c*, an all clear button 32*d*, a start button 32*e*, a stop button 32*f*, speed-dial buttons 32*g*, and a manual-receive button 32*h*.

The function switching button 32*a* is a button for switching the multifunction device FM so as to use it as a copier, a fax machine, or a scanner. Each time this function switching button 32*a* is pressed, the screen display on the liquid crystal display unit 31 switches between a startup menu screen, a copy menu screen, a facsimile menu screen, and the like. Note that, when used as a printer, the multifunction device can be controlled by a user terminal (see FIG. 4).

The numeric key-pad 32*b* is used to set the number of copies, to input telephone numbers for fax transmissions, to assign telephone numbers to the speed-dial buttons 32*g* and the like. The audio guidance/interrupt button 32*c* is used to interrupt a job, and when one wishes to use audio guidance for operational guidance. The all clear button 32*d* is used to reset the various settings made by way of the control panel 30 to default settings.

The start button 32*e* is a button serving to start copy, facsimile, or scanner functions according to the settings that have been entered. The stop button 32*f* is a button that serves to stop a function which has been started. The speed-dial buttons 32*g* are used to call up a previously registered telephone number with a single button. The manual receive button 32*h* is used to switch between automatic fax reception mode and manual fax reception mode.

Figure 4:
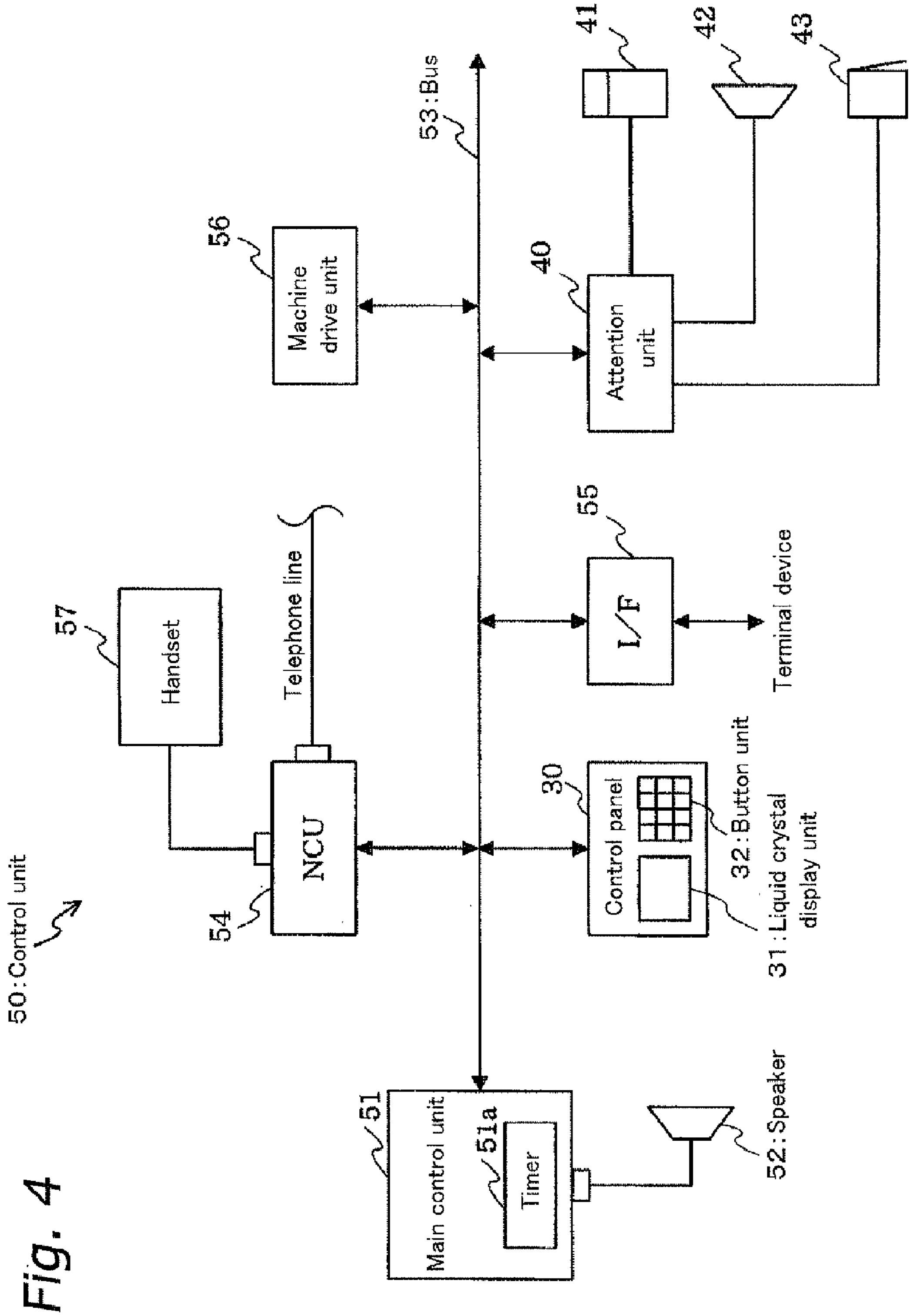
FIG. 4 is a block diagram of a control unit in the image forming device (multifunction device) shown in FIG. 2.

Next, the configuration of the control unit of the multifunction device FM will be described. FIG. 4 is a block diagram illustrating the configuration of a control unit 50 of the multifunction device.

A main control unit 51 includes a CPU, ROM, RAM, and the like, the CPU being driven according to a system program stored in the ROM. Image data and the like is stored in the RAM. Alternatively, a mass storage device, such as a hard disk, can be connected so as to handle large amounts of data.

Furthermore, the main control unit 51 houses a timer 51*a* which counts out a period of time. A speaker 52 is connected to the main control unit 51, and audio guidance for the operations is provided by way of the speaker 52.

Figure 5:
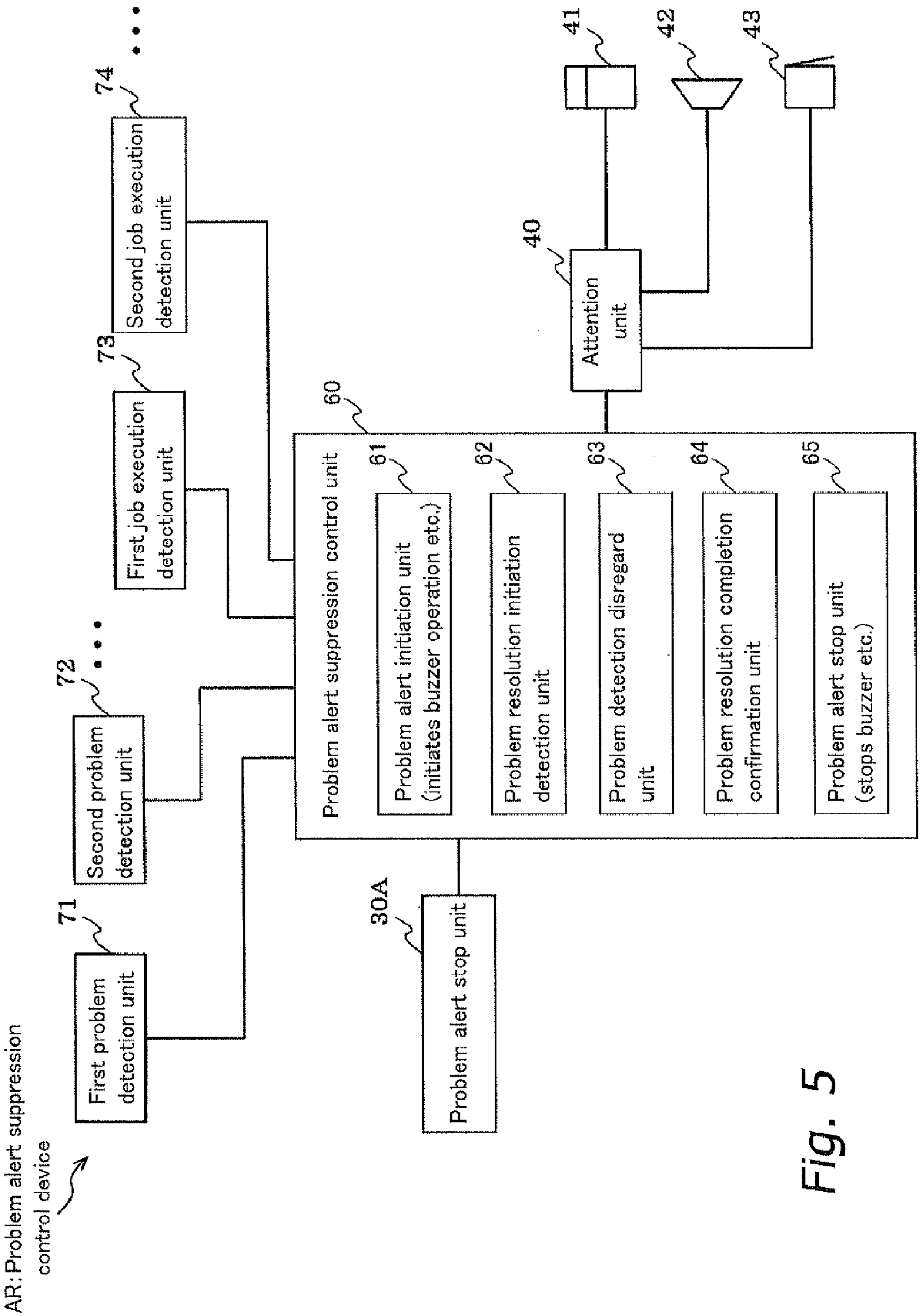
FIG. 5 is a block diagram of a problem alert suppression control device that forms a portion of the control unit shown in FIG. 4.

In addition, the main control unit 51 houses a problem alert suppression control unit 60 (see FIG. 5).

The main control unit 51 is connected to the control panel 30, an NCU (network control unit) 54, an interface (I/F) 55, a machine drive unit 56, the attention unit 40, and the like, by a bus 53. The control panel 30 receives image data from the main control unit 51 for the purpose of displaying operational guidance and problems, and displays this data on the liquid crystal display unit 31, as well as receiving input from the various buttons of the button unit 32 and sending that information to the main control unit 51.

When the multifunction device FM is used as a fax machine, the NCU 54 connects the main control unit 51 to a telephone line and, when a handset 57 is off hook, the NCU 54 connects the handset 57 to the telephone line. The interface 55 is connected to terminal equipment on the user side and receives print commands and image data from the terminal equipment side which it sends to the main control unit 51 side.

The main control unit 51 controls the various machine drive units 56 so as to perform the functions specified by way of the control panel 30 and the terminal equipment. The machine drive unit 56 includes devices required to drive the mechanisms necessary to the multifunction device, such as the scanner mechanism, the drum drive mechanism, the paper feed mechanism, and the like. Furthermore, the machine drive unit 56 is provided with various sensors, and based on signals received from these sensors, the main control unit 51 detects problems as well as user operations. If a problem is detected, the main control unit 51 issues a problem alert using the light 41, the speaker 42, and the buzzer 43 of the attention unit 40.

Next, essential elements of the present mode of embodiment will be described with reference to FIG. 1 and FIG. 5.

FIG. 5 is a block diagram of a problem alert suppression control device AR, which is an essential element of the present mode of embodiment. Note that the attention unit 40 and the like, which are shown in FIG. 5, are as described for FIG. 4.

As shown in FIG. 5, the problem alert suppression control device AR includes problem alert stop unit 30A, the attention unit 40, a problem alert suppression control unit 60, a first problem detection unit 71, a second problem detection unit 72, a first job execution detection unit 73, and a second job execution detection unit 74.

The problem alert stop unit 30A will stop problem alerts when, for example, a user operates the control panel 30 when a problem alert has been issued (buzzer). In addition to the control panel 30, examples of operations include opening the cover of the image output unit 20, pulling out the paper tray 22, and the like.

The attention unit 40 is a problem alert device, and is connected to the light 41, the speaker 42, and the buzzer 43.

The problem alert suppression control unit 60 includes a problem alert initiation unit 61, a problem resolution detection unit 62, a problem detection disregard unit 63, a problem resolution completion conformation unit 64, and a problem alert stop unit 65.

The problem alert initiation unit 61 includes a function for flashing the light 41, emitting a signal tone or making an announcement from the speaker 42, sounding the buzzer 43, or the like (problem alert starting function) when the first or second problem detection units 71 or 72, or the first or second job execution detection units 73 or 74, detect a problem or job execution.

The problem resolution detection unit 62 includes a function for detecting the start of problem resolution when operations are begun (start of problem resolution) that stop the flashing light, the signal tone, the buzzer, or the like, by way of the problem alert stop unit 30A. A function is included therein that detects the start of problem resolution not only in response to operation of the problem alert stop unit 30A, but also in response to, for example, opening the cover of the image output unit 20, pulling out the paper tray 22, and the like.

The problem detection disregard unit 63 includes a function whereby, when a user is working to resolve a problem in response to, for example, a buzzer that was operated by the first problem detection unit 71 (for the initially detected problem A in FIG. 1), even if the second problem detection unit 72 detects a problem (the subsequently detected problem B), the detection of problem B will be disregarded and buzzers and the like are not operated. Likewise, with regard to problems detected after the detection of problem B, if work is under way to resolve a problem based upon the initially detected problem A, buzzers and the like are not operated for these subsequently detected problems.

Note that situations in which the detection of problems will be disregarded include those in which users who are working to resolve a problem do not feel disturbed by lights (displays, flashing lights and the like). Accordingly, in these situations, the detection of problems may not be disregarded.

The problem resolution completion confirmation unit 64 includes, for example, a function for confirming a predetermined problem resolution has been input in cases where a user completes a problem solution and inputs a predetermined problem resolution by way of the control panel 30.

The problem alert stop unit 65 includes a function for stopping the buzzer or the like when a user has begun work on resolving a problem, as well as after confirmation of problem resolution by the problem resolution completion confirmation unit 64.

Figure 6:
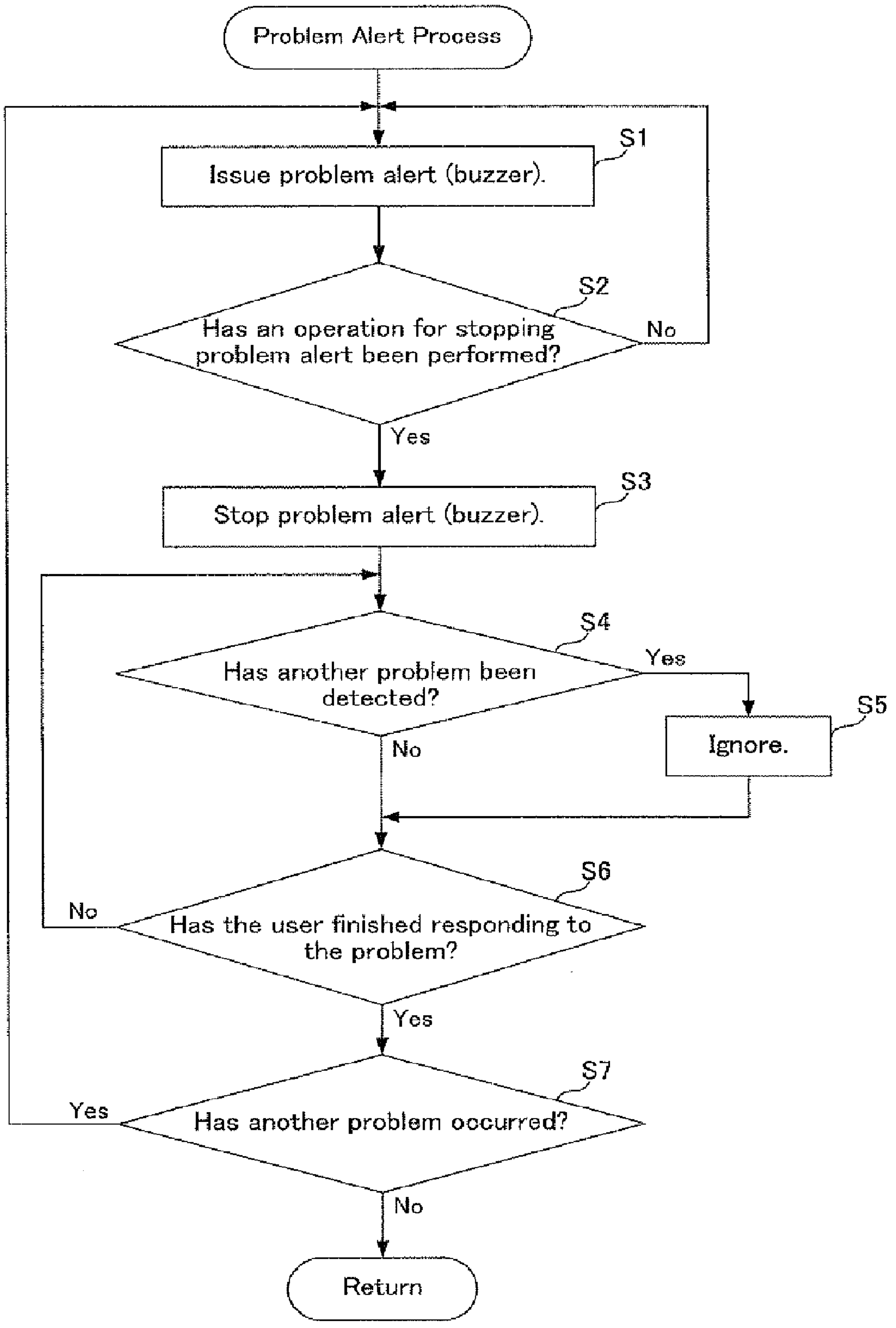
FIG. 6 is an operational flowchart for the image forming device (multifunction device) shown in FIG. 2.
Figure 8:
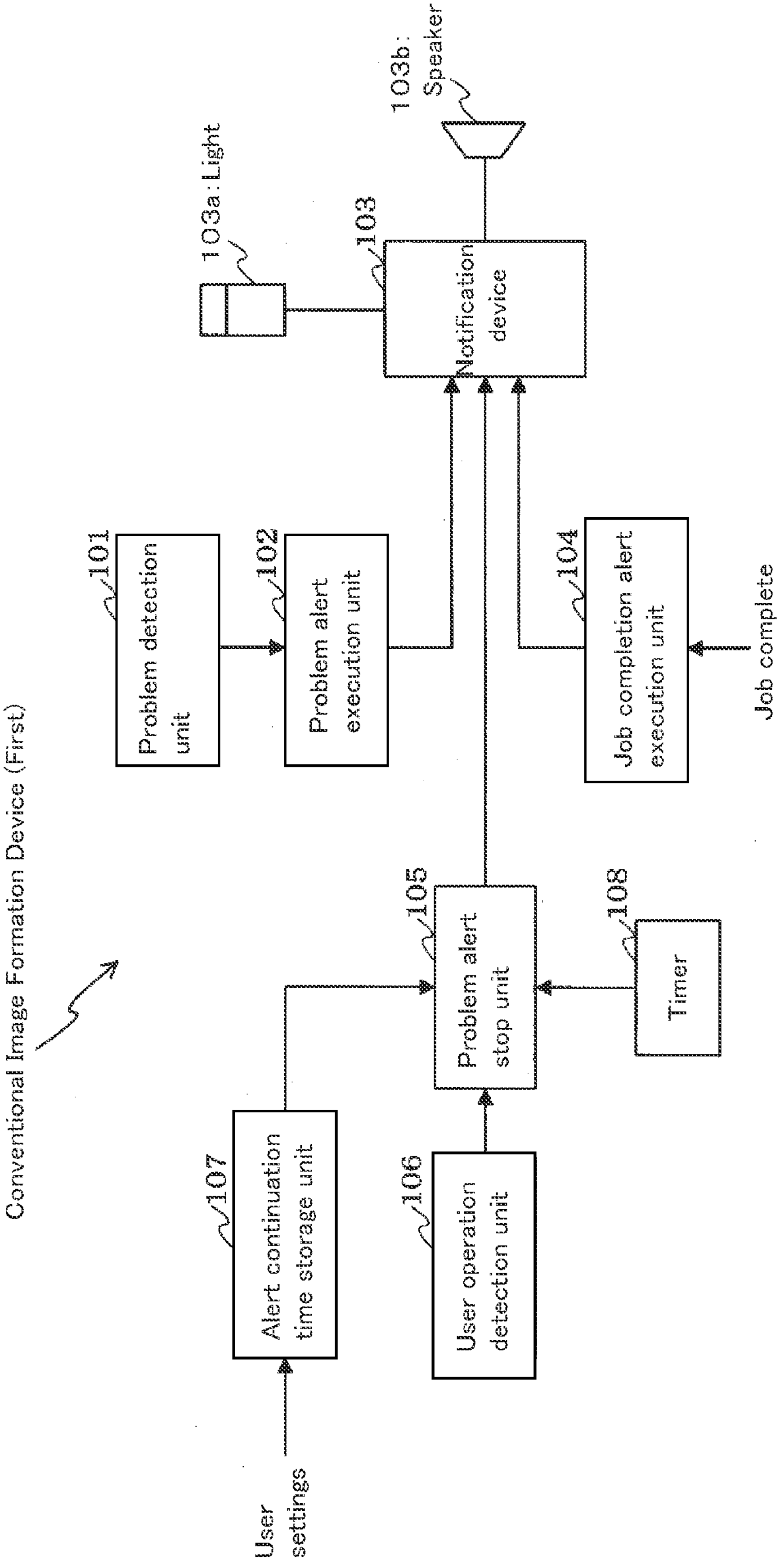
FIG. 8 is a block diagram of a first example of a conventional image forming device.
Figure 9:
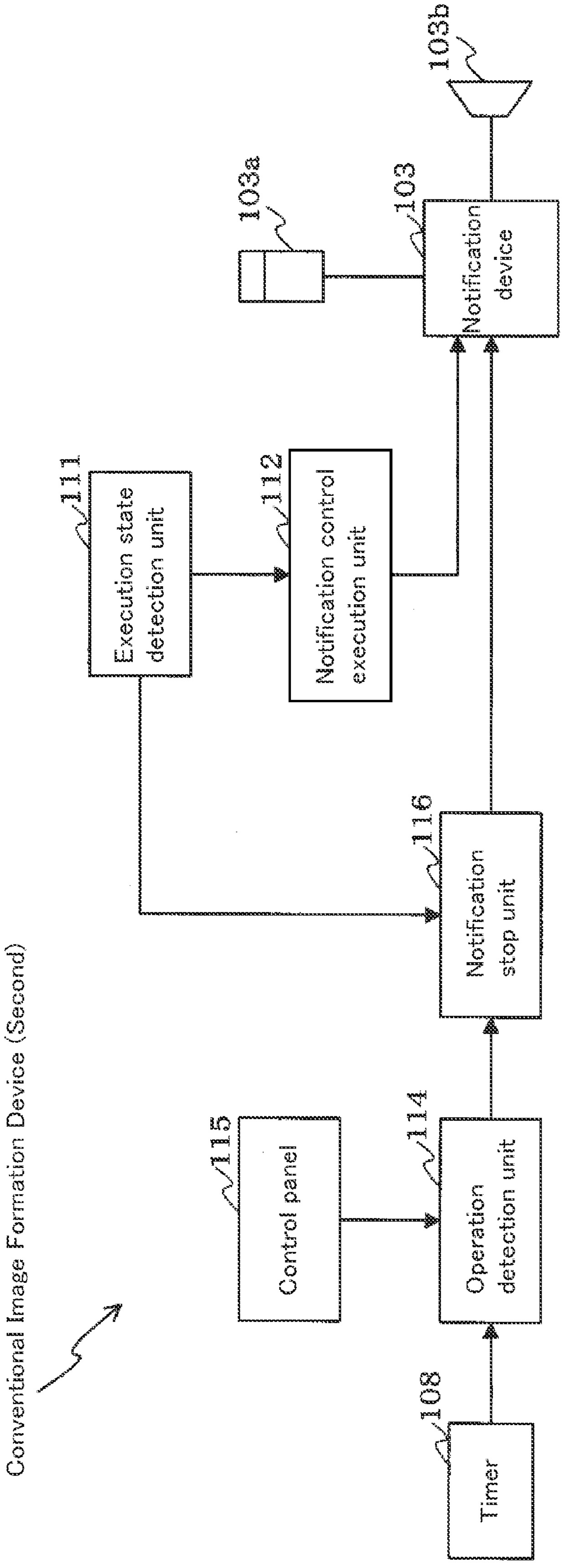
FIG. 9 is a block diagram of a second example of a conventional image forming device.

Next, turning to FIG. 1, FIG. 5 and FIG. 6, the operation of the present mode of embodiment will be described. FIG. 6 is a flowchart for the present embodiment.

If, for example, the first problem detection unit 71 detects an initial problem A ("2" in FIG. 1), the buzzer 43 is operated by the problem alert initiation unit 61 so as to issue a problem alert ("3") (step S1).

The user hears the buzzer and performs an operation that stops the problem alert with the problem alert stop unit 30A ("4") (step S2: yes), whereupon the buzzer is stopped by the problem alert stop unit 65 ("5") and the user performs work to resolve the problem (step S3). If an operation that stops the problem alert is not performed in step S2 (step S2: no), the routine will return to step S1, and the buzzer will continue to operate. Note that, since the buzzer is noisy, it is, for example, possible to switch from the buzzer to a display or a flashing light after the buzzer has operated for five minutes.

If a subsequent problem is detected (for example, a problem B detected by the second problem detection unit 72) while the user is involved in work to resolve the problem (step S4: yes), the detection of that problem B is disregarded by the problem detection disregard unit 63. Accordingly, a problem alert is not issued (step S5).

Next, if a subsequent problem B has not been detected (step S4: no) or if the detection of a problem B has been disregarded (step S5), the problem resolution completion confirmation unit 64 will confirm that the response to the problem has been completed by the user (problem resolution) (step S6: yes), and if another problem has not been detected (including problem B) (step S7: no), the routine will advance to Return.

If the response to problem A is not completed by the user in step S6 (step S6: no), steps S4 to S6 are repeated.

If another problem (for example, a problem C not shown in the figures) has occurred at step S7 (step S7: yes), the routine will return to step S1. In this case, a problem alert is issued on the basis of problem C (step S1).

Note that, in the description provided by the flowchart in FIG. 6, only situations in which a buzzer is used is shown, but similar processing can be performed with the light 41 and the speaker 42. Furthermore, similar processing can be performed when the first and second job execution detection units 73 and 74 detect job execution. However, with the job execution detection unit, the signal tone or the like is relatively short and therefore creates very little visual or aural annoyance while working to resolve a problem.

The present invention describes an image forming device, but the present invention can of course be applied to any device provided with problem alert unit (such as a buzzer).

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An image forming device, comprising:

a problem detection unit for detecting a problem with the image forming device;

a problem alert unit for alerting a user to the detection of a problem with the image forming device;

wherein the problem alert unit will not issue a problem alert based upon a problem subsequently detected by the problem detection unit until a problem initially detected by the problem detection unit has been resolved.

2. The image forming device set forth in claim 1, further comprising a plurality of problem detection units;

wherein the problem alert unit will not issue a problem alert based upon a problem subsequently detected by one problem detection unit until a problem that was initially detected by another problem detection unit is resolved.

3. The image forming device set forth in claim 1, wherein if problem resolution has not been performed based upon the problem subsequently detected by the problem detection unit, a problem alert will issued by the problem alert unit based upon the subsequently detected problem after the initially detected problem has been resolved.

4. The image forming device set forth in claim 1, wherein a plurality of types of problems are detected by the problem detection unit, and a priority ranking is determined for each problem according to a relative importance thereof; and the problem alert unit will not issue an alert for a detected problem having a higher priority ranking until a detected problem having a lower priority ranking is resolved.

5. The image forming device set forth in claim 1, wherein the problem alert unit issues a problem alert by generating a sound.

6. The image forming device set forth in claim 1, wherein the image forming device performs a plurality of functions selected from a group consisting of a copy function, scanner function, a facsimile function, and a printer function.

* * * * *